Aug. 30, 1966
E. R. HUTCHINSON
3,269,740
VEHICLE MOVING MECHANISM
Filed Sept. 2, 1964
2 Sheets-Sheet 1
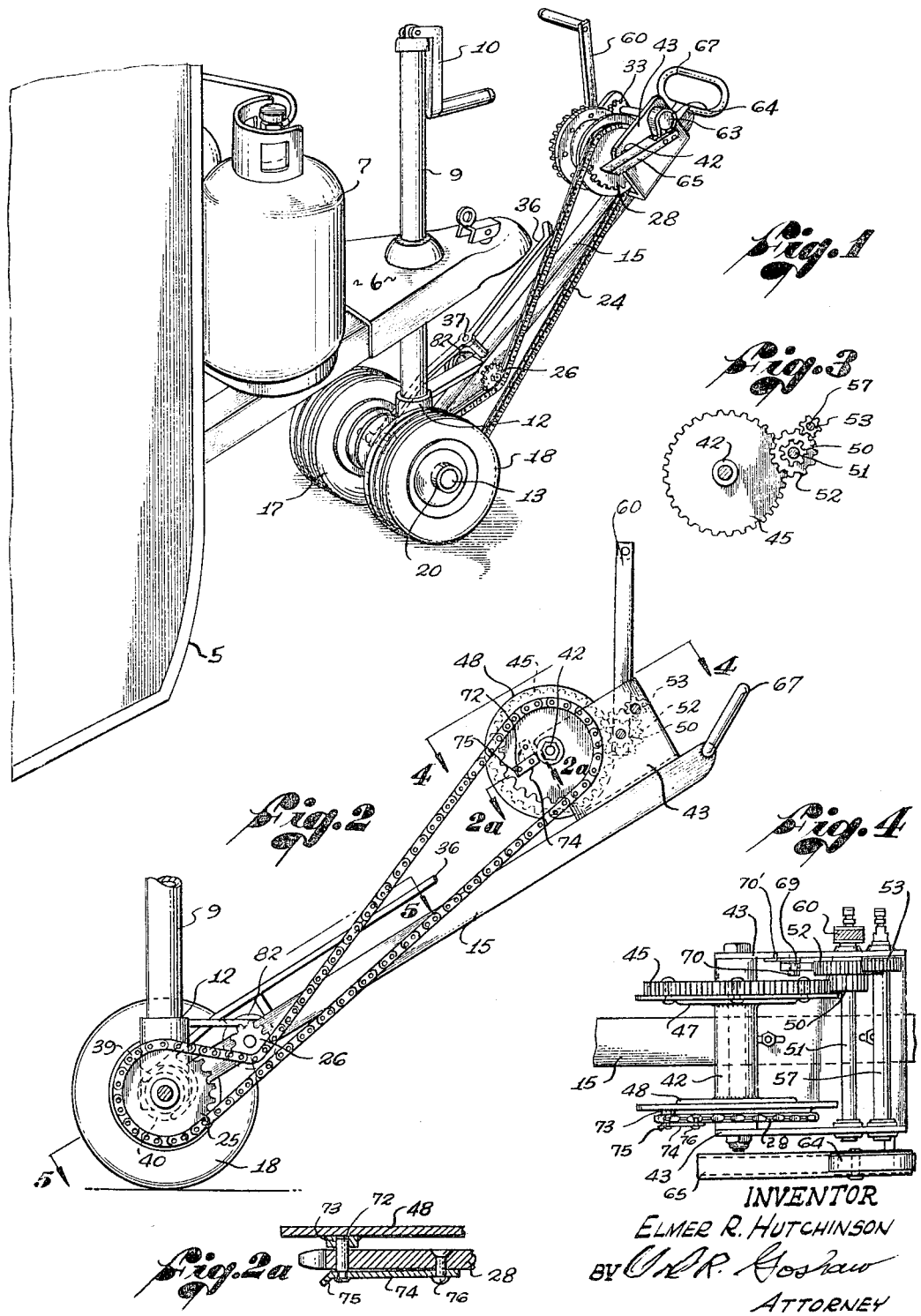
INVENTOR
ELMER R. HUTCHINSON
BY O.R. Goshaw
ATTORNEY Aug. 30, 1966   E. R. HUTCHINSON   3,269,740
VEHICLE MOVING MECHANISM Filed Sept. 2, 1964   2 Sheets-Sheet 2

INVENTOR.
ELMER R. HUTCHINSON
BY *Srl R. Gorham*
ATTORNEY

United States Patent Office
3,269,740
Patented August 30, 1966

3,269,740
VEHICLE MOVING MECHANISM
Elmer R. Hutchinson, 11616 Burbank Blvd.,
North Hollywood, Calif.
Filed Sept. 2, 1964, Ser. No. 394,014
8 Claims. (Cl. 280—3)

This invention relates to moving mechanisms and particularly to a dolly for moving trailers and vehicles of different types.

It is well known that it becomes necessary from time to time to move house, boat, horse, truck trailers and aircraft between certain locations in a park or field. With small camping or boat trailers, this may be accomplished by one person when the front of the A-frame is on its own caster wheel or wheels. However, for heavy trailers, trailers which are to be moved up a grade or are mired in soft earth or sand, and airplanes, this hand operation cannot be accomplished, particularly by one person.

The present invention is directed to a dolly which may be operated by one person to move and relocate heavy trailers in trailer parks or to extricate bogged-down trailers. The dolly utilizes a pair of supporting wheels which have a tongue with a gripping handle at the end thereof and a geared-down winch for driving the supporting wheels when operated. A two-ratio drive is provided which will permit one person to move the heaviest of the type of vehicles mentioned above from one location to another. The dolly is also equipped to utilize a "dead man" cable connection which will permit the trailer to be extricated from a mired position or to move trailers up an incline. Other features of the dolly will be understood from the complete description presented hereinafter.

The principal object of the invention, therefore, is to facilitate the moving of trailers of different types by one person.

Another object of the invention is to provide an improved vehicle and trailer moving dolly which is operative by one person.

A further object of the invention is to provide an improved vehicle and trailer moving dolly provided with selective gear ratios, a "dead man" cable attachment, and a free-wheeling mechanism.

A better understanding of this invention may be had from the following detailed description when read in conjunction with the accompanying drawings, in which:

FIG. 1 is a perspective view of a trailer connected to a dolly embodying the invention;

FIG. 2 is a side elevational view of the dolly as shown in FIG. 1;

FIG. 2a is a detailed view of a free-wheeling locking pin taken along the line 2a—2a of FIG. 2;

FIG. 3 is a detailed view of the driving gears used in the invention;

FIG. 4 is a top view of the driving gears and drum taken along the line 4—4 of FIG. 2;

Figure 5:
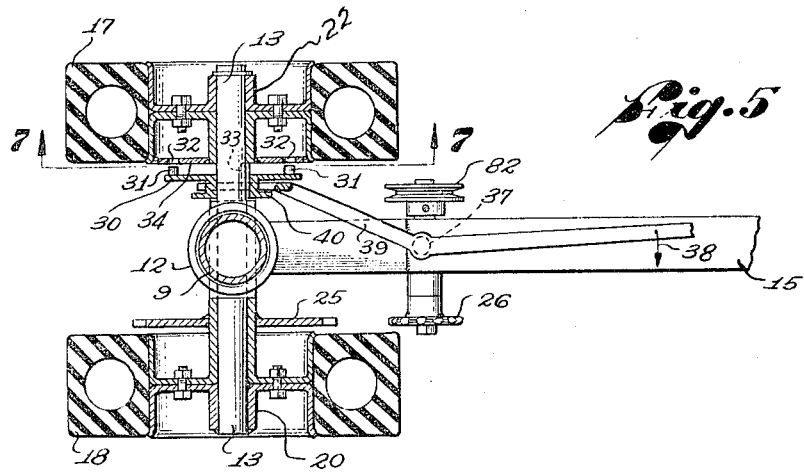
FIG. 5 is a cross-sectional view taken along the line 5—5 of FIG. 2.

Referring, now, to the drawings in which the same reference numeral identifies the same element, a front portion of a trailer 5 is shown with the front of an A-frame 6 on which is mounted a gas bottle 7 and a caster shaft or jack standard 9 with its handle 10 for raising and lowering the end of A-frame 6. The lower end of the caster shaft of jack standard 9 is adapted to fit in a socket 12 mounted on a shaft or axle 13, the socket being connected to or integral with a tongue 15.

On the shaft or axle 13 is a pair of wheels 17 and 18, the wheel 18 having its rim structure 20 fixedly attached to one end of the shaft 13. The other wheel 17 has its rim structure 22 rotatably mounted on the other end of the shaft 13. A chain 24 passes around a sprocket 25 under a tightening idler 26, either of the sprocket or flanged pulley type, and then over a driving sprocket 28. The sprocket 25 is fixedly attached to the shaft 13 and thus will rotate the entire shaft when turned. However, wheel 17 will not be rotated by rotation of the sprocket 25 unless a clutch plate 30 has been axially moved outwardly as shown in FIG. 5 so that the pins 31 thereof fit into a pair of holes 32 in the plate 34. Since the plate 34 is welded to the rim structure 22, the wheel 17 will now be driven along with wheel 18 when the hand-operated lever 36 pivoted at 37 on tongue 15 is moved in the direction of the arrow 38. This movement will move the plate 30 outwardly since the end of the arm 39 is positioned in the yoke 40 which is attached to the clutch plate 30 and pins 31. A key 33 on which the yoke 40 is slidable locks the driving plate 30 to the shaft 13. This clutch arrangement is desirable in the case of the slippage of one wheel with respect to the other or to provide a differential action when sharp turns are necessary.

Referring, now, to FIGS. 2, 3, and 4, the chain driving sprocket 28 is mounted on a shaft or axle 42 which is supported by a U-shaped bracket 43 on tongue 15, the shaft 42 also having mounted thereon a gear 45. On the inner surfaces of the sprocket 28 and gear 45 are plates 47 and 48 for guiding a cable therebetween on shaft 42. The gear 45 is in mesh with a gear 50 on a shaft 51 on which is a gear 52. Gear 52 is in mesh with a gear 53, the gear 53 being on a shaft 57. For one gear ratio, a handle 60 may be mounted on the end of shaft 57 and thus the chain driving gear 28 will be driven from gear 53 through gear 52 and gear 50 to gear 45 which will provide a large torque ratio between the handle 60 and the driving sprocket 28. For lighter loads, or when a higher speed of operation is desired, the handle 60 may be placed on the end of shaft 51, as shown in FIG. 4, to turn the driving sprocket at a higher speed ratio.

Also mounted on the end of shaft 57 is a brake drum 63 around which is a brake band 64 which may be tightened by a lever 65 to hold the trailer from moving too rapidly down a grade.

Thus, to move a trailer, the standard 9 is placed in the socket 12, the handle 67 at the end of tongue 15 is gripped and used for steering, and the handle 60 rotated in the direction in which it is desired to move the trailer 5. If the trailer is moved in one direction, a pawl 69 is thrown in a direction to lock the gear 52, while if the trailer is being moved in the opposite direction, the pawl is thrown in the opposite direction to lock the gear 52. The pawl is a double-toothed element pivoted on a shaft 70 with an over-center spring arrangement 70' to hold it in the desired position.

As shown in FIGS. 2 and 2a, the chain drive sprocket 28 may be released from the plate 48 and the winch gears by moving a pin 72 from the socket in a boss 73 on plate 48, the pin 72 passing through gear 28 and being mounted on a leaf spring 74 removable by handle 75. By moving the pin, the unit may become free-wheeling to facilitate moving the dolly by itself or when used for light loads. As shown in FIG. 2, the spring 74 and pin 72 rotate on pin 76 to place the pin in an inoperative position.

Figure 6:
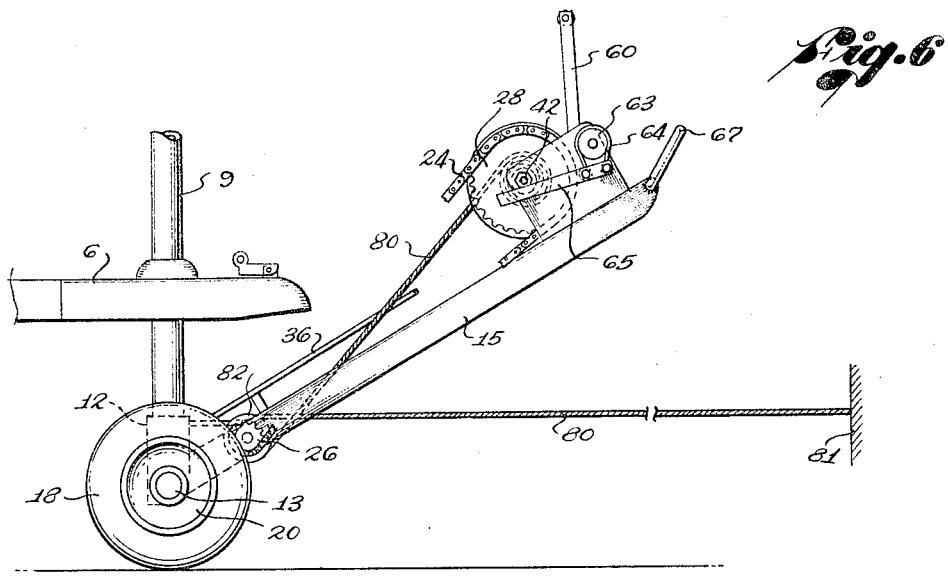
FIG. 6 is a side elevational view showing the "dead man" cable attachment.
Figure 7:
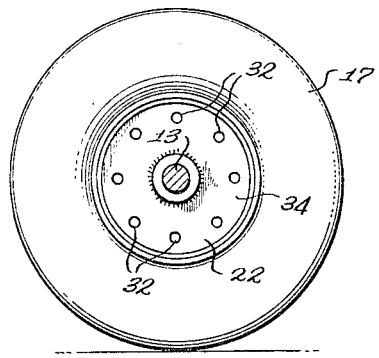
FIG. 7 is an elevational view of the clutch plate taken along the line 7—7 of FIG. 5.

As mentioned above, a "dead man" feature is embodied in the dolly, this feature being shown in FIG. 6. A cable 80, shown fixedly attached or anchored at one end 81, is wound around a pulley 82 and then around the shaft 42 to which the end of the cable is connected. The plates 47 and 48 form a cable drum. In this manner, a very strong pull may be provided for moving a mired trailer or a trailer up a steep incline. For further pulling force, a block, namely, a pulley, would be attached at 81 and the cable 80 passed around the pulley and the end attached back to the dolly which would increase the pulling force one hundred percent.

The above dolly, therefore, has many features which will permit the easy moving of trailers on parking lots to relocate them or may be used on the road in case of mired conditions. It can be used with free-wheeling when the loads are light or can provide various degrees of pulling strength as described above. Although a hand crank is shown, it is to be understood that a small gasoline motor or an electrical motor may be mounted on the dolly to rotate the gear train.

I claim:

1. A dolly having wheels adapted to support the front end of a trailer, a tongue extending upwardly from said wheels, a winch having a plurality of gears, a chain driving sprocket attached to said gears, a sprocket on the axle of said wheels, a chain between said axle sprocket and said chain driving sprocket, and means for activating said gears, said wheels being a pair of wheels and a clutch is provided for connecting and disconnecting one of said wheels from said axle sprocket.

2. A dolly having wheels adapted to support the front end of a trailer, a tongue extending upwardly from said wheels, a winch having a plurality of gears, a chain driving sprocket attached to said gears, a sprocket on the axle of said wheels, a chain between said axle sprocket and said chain driving sprocket, and means for activating said gears, means being provided for varying the gear ratio between said gear driving sprocket and said gear actuating means.

3. A dolly having wheels adapted to support the front end of a trailer, a tongue extending upwardly from said wheels, a winch having a plurality of gears, a chain driving sprocket attached to said gears, a sprocket on the axle of said wheels, a chain between said axle sprocket and said chain driving sprocket, and means for activating said gears, said winch including a cable drum, a cable being provided around said drum and having one end attached to said drum, around an idler on said dolly, and adapted to be attached to a fixed anchor.

4. A dolly having wheels adapted to support the front end of a trailer, a tongue extending upwardly from said wheels, a winch having a plurality of gears, a chain driving sprocket attached to said gears, a sprocket on the axle of said wheels, a chain between said axle sprocket and said chain driving sprocket, and means for activating said gears, said wheels are a pair of wheels, means being provided for connecting and disconnecting said chain driving sprocket from said gears together with means for connecting and disconnecting one of said wheels from said gears.

5. A vehicle moving device for operation by one person comprising at least one wheel for supporting one end of a vehicle to be moved, a tongue for guiding said wheel during movement of said vehicle, means attached to said wheel for rotating said wheel, and means on said tongue for rotating said wheel rotating means, said last-mentioned means including a winch having a plurality of intermeshed gears and means for rotating said gears, said means being adapted to be connected to said gears in different positions to vary the turning ratio between said wheel and said means for rotating said gears.

6. A vehicle moving device for operation by one person comprising at least one wheel for supporting one end of a vehicle to be moved, a tongue for guiding said wheel during movement of said vehicle, means attached to said wheel for rotating said wheel, and means on said tongue for rotating said wheel rotating means, a pair of wheels being provided for supporting one end of said vehicle, said tongue being mounted between said wheels, means being provided for connecting and disconnecting one of said pair of wheels to and from said means for rotating said wheels.

7. A vehicle moving device in accordance with claim 5 in which a brake is mounted on said tongue and adapted to brake the rotation of said plurality of gears.

8. A vehicle moving device in accordance with claim 5 in which a drum is provided, said drum being rotatable by said gears, together with a cable around said drum and having one end extending to a fixed anchor to provide a "dead man" attachment to said winch, the other end of said cable being attached to said drum.

References Cited by the Examiner

UNITED STATES PATENTS

| 1,219,209 | 3/1917 | Zane. | |
|---|---|---|---|
| 2,037,700 | 4/1936 | Bennett | 280—3 |
| 2,814,505 | 11/1957 | Kelly | 280—3 X |
| 3,156,315 | 11/1964 | Hawgood | 280—3 X |
| 3,183,013 | 5/1965 | Brown | 280—3 |

FOREIGN PATENTS

| 208,677 | 1/1924 | Great Britain. |
|---|---|---|
| 1,296,605 | 5/1963 | France. |

LEO FRIAGLIA, *Primary Examiner.*